United States Patent [19]

Snijders et al.

[11] Patent Number: 4,464,746

[45] Date of Patent: Aug. 7, 1984

[54] ARRANGEMENT FOR CORRECTING PULSE DISTORTION IN HOMOCHRONOUS DATA TRANSMISSION

[75] Inventors: Wilfred A. M. Snijders; Johannes J. W. Kalfs; Petrus J. Van Gerwen, all of Eindhoven, Netherlands

[73] Assignee: U.S. Philips Corporation, New York, N.Y.

[21] Appl. No.: 342,984

[22] Filed: Jan. 26, 1982

[30] Foreign Application Priority Data

Feb. 11, 1981 [NL] Netherlands ............... 8100650

[51] Int. Cl.$^3$ ............................................. H04B 3/20
[52] U.S. Cl. ..................................... 370/32; 179/170.2
[58] Field of Search ................ 179/170.2; 364/724; 370/24, 32; 375/14; 328/164, 165

[56] References Cited

U.S. PATENT DOCUMENTS

| 3,735,055 | 5/1973 | Thomas | 179/170.2 |
| 3,821,494 | 6/1974 | Besseyre | 179/170.2 |
| 4,334,128 | 6/1982 | Snijders | 179/170.2 |
| 4,355,214 | 10/1982 | Lévy et al. | 179/170.2 |
| 4,362,909 | 12/1982 | Snijders et al. | 179/170.2 |

Primary Examiner—Douglas W. Olms
Assistant Examiner—Kenneth I. Rokoff
Attorney, Agent, or Firm—Thomas A. Briody; William J. Streeter

[57] ABSTRACT

In the duplex transmission of data signals over two-wire transmission paths the phenomenon of echo-signals is encountered, while simultaneously intersymbol interference occurs between the data symbols themselves. In order to reduce the influence of both the echo signals, and the intersymbol interference, the arrangement comprises a random access memory (16) which produces a correction value ($\hat{c}(i)$) at each sampling instant to correct the received data signal. The memory is addressed from registers (13, 14) and a counter (15), the contents of the registers being determined by the data symbols transmitted last and the data symbols received last, respectively. A D-A converter (19) converts the correction value into a correction signal ($\tilde{c}(t)$), which in a difference producer (20) is subtracted from the received data signal. A sampling arrangement (21) samples the corrected received data signal. After D-A conversion (22) and multiplication (17) by a predetermined factor $\alpha$ each sample furnishes a number by which the correction value is changed to match it to the value of the pulse distortion at the sampling instant.

1 Claim, 1 Drawing Figure

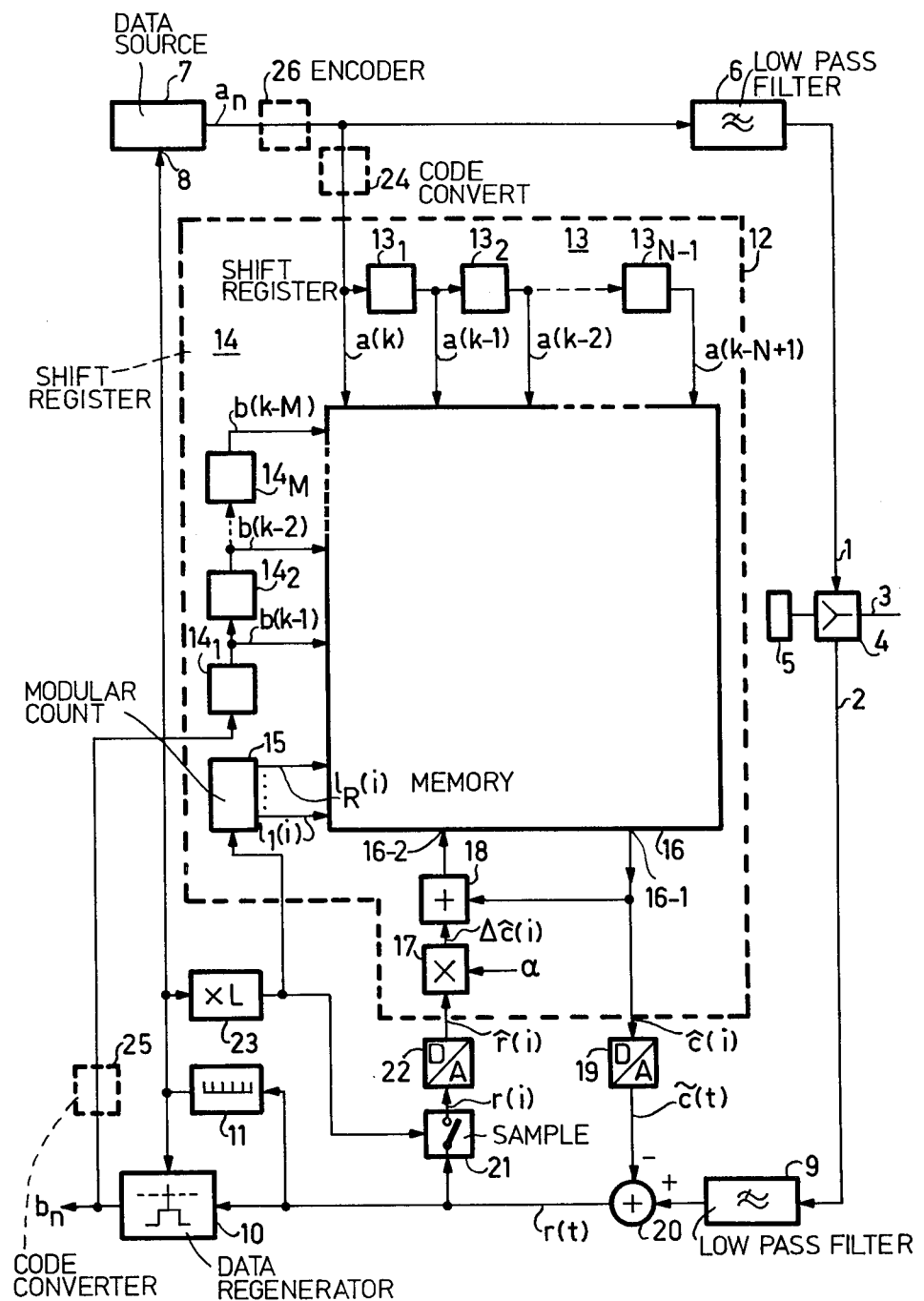

ARRANGEMENT FOR CORRECTING PULSE DISTORTION IN HOMOCHRONOUS DATA TRANSMISSION

BACKGROUND OF THE INVENTION (1) Field of the Invention

The invention relates to an arrangement for correcting the pulse distortion caused by echo signals and intersymbol interference, particularly for use in transmission systems for simultaneous two-way transmission of homochronous data signals over two-wire transmission paths.

(2) Description of the Prior Art

Transmission systems for information signals are usually formed by a combination of two-and four-wire connections. Four-wire connections are formed by two one-way paths, namely by a one-way send path and a one-way receive path. A two-wire connection is formed by a two-way path over which signals can be transmitted simultaneously in mutually opposite directions in one and the same frequency band. These different paths are interconnected by means of a hybrid.

As is known, a hybrid is formed by a four-port circuit. A first port, what is commonly referred to as the send port is connected to the one-way send path. A second port, what is commonly referred to as the receive port, is connected to the one-way receive path; a third port, what is commonly referred to as the cable port, is connected to the two-way path, while a balancing network is connected to the fourth part, what is commonly referred to as balancing port. Said balancing network has for its object to match the hybrid to the cable impedance. When this balancing network is adjusted perfectly, a signal in the send path will appear at the cable port, but will not appear in the receive path. If in contrast therewith a signal is applied over the two-way path to the cable port, then with a perfect adjustment of the balancing network this signal will appear in the receive path but not in the send path.

Owing to the diverse cable lengths and cable types which may form the two-way path connected to the cable port, the cable impedance is usually not known accurately, so that the balancing network can never be adjusted perfectly. The result is that a portion of the signal occurring in the send path reaches the receive path via the hybrid.

As every two-way path usually comprises one or more discontinuities against which a signal may partly reflect, a reflected version of the signal occurring in the send path may, furthermore, be expected to appear in the receive path. The two parts of the signal occurring in the send path, which occur in the above-described manner in the receive path will, together, be designated, as is customary, the echo signal and will result in the occurrence of pulse distortion in the received signal.

The quality of the received signal is not only negatively influenced by the occurrence of the echo signal reaching the one-way receive path in the above-described manner, but also by the presence of a second cause of pulse distortion in this received signal. Said pulse distortion is the result of the non-ideal transmission characteristic, for pulse transmission, of the two-way path through which the received signal is applied to the cable port of the hybrid and manifests itself as a mutual influencing of the individual data symbols in the received signal. As is customary, this type of pulse distortion will be designated intersymbol interference.

In order to be able to guarantee high-grade information transmission when transmission systems formed by a combination of two- and four-wire connections are used, it is therefore necessary to employ circuits by means of which both the intersymbol interference and the echo signal can be eliminated, or at least the negative influence of both of them on the quality of the signal in the receive path can be significantly reduced.

It is customary that in transmission systems the intersymbol interference is reduced to the best possible extent by arranging in series with the path to be traversed by the received signal an equalizer arrangement the transfer characteristic of which is adjusted in such a manner, automatically or non-automatically, that it becomes equal to the best possible extent to the inverse of the transfer characteristic of the two-way path. In addition, it is customary that the echo signal is reduced as much as possible by the use of circuits which are commonly referred to as echo cancellers.

Reference 1 of paragraph D describes an embodiment of an echo canceller of such a type. The echo canceller described therein comprises a cancelling circuit connected to the one-way send path, by means of which a synthetic echo signal is generated whose shape corresponds to the best possible extent with the echo signal to be expected and which, after digital-to-analogue conversion, is subtracted from the signal present in the receive path, to form a residual signal from which the echo signal has been removed to the best possible extent. This echo cancelling circuit is formed by a random access memory (RAM), consisting of $2^N$ memory locations, which can be individually addressed by means of an address code consisting of N bits. This address code is obtained from a shift register connected to the one-way send path and comprises the N data symbols which were last transmitted and addresses in the RAM a compensation value in digital form, which after digital-to-analogue conversion is subtracted from the signal present in the receive path in order to cancel the echo signal contained therein. The residual signal thus obtained is used to re-adjust iteratively the contents of the RAM in such a way that the best possible cancellation of the echo signal is achieved.

Although the prior art echo cancellers can eliminate the echo signal in the one-way receive path in a satisfactory manner, or are at least capable of reducing the negative influence thereof to a considerable extent, the resulting residual signal is nevertheless still of an insufficient quality for high-grade data transmission, which is due to the presence of intersymbol interference in said residual signal. In order to obtain a residual signal of a sufficient quality a separate equalizing circuit in series with the path to be traversed by the received signal is still required.

SUMMARY OF THE INVENTION

The invention has for its object to provide an arrangement for correcting pulse distortion produced by the simultaneous presence of an echo signal and intersymbol interference in the received signal in transmission arrangements for the simultaneous two-way transmission of homochronous data signals in the same frequency band over two-wire connections.

According to the invention, the arrangement for correcting pulse distortion in a transmission system for simultaneous two-way transmission of data signals formed by sequences of data symbols over a two-wire transmission path comprises a random access memory and means for addressing the memory at uniformly distributed intervals by address code words which depend on the transmitted data symbols, means for applying after each addressing operation of a memory location a correction signal having a value depending on the content of the memory location to a difference detector which also receives the data signal from the two-wire transmission path, for providing a corrected received data signal which is applied to a data regenerator, and means for changing at uniformly distributed instants the content of the addressed memory location according to the corrected received data signal. The address codewords for addressing the random access memory are derived both from the transmitted data symbols applied to the two-wire transmission path and from the received data symbols regenerated by the data regenerator, as well as from the counting position of a modulo-L counter which is driven by clock pulses at L times the data symbol rate, wherein L is an integer.

SHORT DESCRIPTION OF THE FIGURE

FIG. 1 is a block schematic circuit diagram of the west side of a transmission system arranged for duplex transmission of homochronous data signals over two-wire connections, which comprises a correction arrangement for correcting pulse distortion in accordance with the invention.

REFERENCE

1. "A transmission module for the digital subscriber loop;" B. O. Justness; Conference Records of "Communication 80," Birmingham 1980, pages 73–76.

DEFINITIONS

1. Two signals are homochronous if corresponding significant instants have a constant, fixed phase relationship.
2. A homochronous transmission system is a system for the transmission of signals in two opposite directions, signals which must be transmitted in one direction being homochronous with signals which are transmitted in the opposite direction.

DESCRIPTION OF THE PREFERRED EMBODIMENT

FIG. 1 is a block schematic circuit diagram of the west side of a homochronous transmission system for binary data signals which consists of a west side and an east side (not shown), which are interconnected by a transmission path. The east side is identical to the west side but for some clock signal connections, to be noted further on. The west side of the system has a one-way send path 1 and a one-way receive path 2, the west side being connected to the east side by a two-way path 3. These several paths are interconnected by means of a hybrid 4. A balancing network 5 is also connected to this hybrid 4 to match the impedance of said hybrid 4 to the impedance of the two-way path 3.

In the transmission system shown, the send path 1 comprises a low-pass filter 6. A data source 7 which produces binary data symbols $a_n$ is connected to this send path. The quantity n represents the number of the data symbol. These data symbols occur at a rate $1/T$. To this end a clock signal is applied to said data source via a clock signal input 8. The pulse repetition rate of this clock signal is also $1/T$.

In the embodiment shown, the one-way receive path 2 comprises a low-pass filter 9 and a pulse regenerator 10. This pulse regenerator 10 is controlled by a clock signal the pulse repetition rate of which is also equal to $1/T$. At the output of the pulse regenerator 10 there are now obtained binary data symbols $b_n$ occurring at a symbol rate of $1/T$ which have been transmitted by the data source from the east side of the system via the two-way path 3 to the hybrid 4, which applies these data symbols to the one-way receive path 2.

The clock signal applied to the pulse regenerator 10 and also to the data source 7 of the west side is generated by a clock extraction circuit 11, which is coupled to the receive path 2 and derives said clock signal in known manner from the signals occurring in the receive path 2. At the east side of the system, which is constructed in a similar manner as the west side, the data source 7 is controlled by a master clock, and the connection between clock extraction circuit 11 and clock input 8 shown in the FIGURE is missing there.

Since in practice the impedance of the two-way path 3 is not accurately known, the balancing network 5 does not form a perfect termination of the hybrid 4. This results in a direct leakage from send path 1 to the receive path 2 via this hybrid 4. In addition, impedance discontinuities in the two-way path 3 result in signal reflections. Both effects result in echos of the output signal of the low-pass filter 6 appearing in the receive path 2. The received signals coming from the data source at the east side are distorted by the occurrence of the said echos in the receive path 2. This has a negative influence on the pulse resolution in the pulse regenerator 10. A further pulse distortion of the received signal is the result of the mutual influencing of the individual data symbols. This intersymbol interference is predominantly caused by transients occurring in the pulse transmission over the two-way path 3, which may extend over several symbol intervals T. This distortion also has a negative influence on the pulse resolution in pulse regenerator 10.

In order to eliminate the disturbing influence of the pulse distortion occurring both as a result of echo signals and as a result of intersymbol interference to the best possible extent, the portion of the transmission system shown in FIG. 1 comprises an adjustable correction arrangement 12, which has a construction in accordance with the invention and is connected to the one-way send path 1, the one-way receive path 2, the output of the pulse regenerator 10 and the output of a frequency multiplier 23 (multiplier L). At the discrete instants $t_o + i\tau$ the correction arrangement 12 produces a synthetic correction signal $\hat{c}(i)$ in digital form. Herein $1/T$ is the sampling rate used in the correction arrangement 12, i represents a number of the set $0, \pm 1, \pm 2, \ldots$ and $t_o$ is a reference instant. The synthetic correction signal $[\hat{e}(t)]\hat{c}(i)$ is converted by a digital-to-analogue converter 19 into a time-continuous and amplitude-discrete correction signal $\tilde{c}(t)$. This correction signal $\tilde{c}(t)$ is applied to a difference network 20 and subtracted from the signals in the receive path 2. At the output of the difference network 20 there now appears a residual signal $r(t)$ which at the discrete instants $t_o + i\tau$ is predominantly free from both echos and intersymbol interference and is applied to the pulse regenerator 10.

For adjusting the correction arrangement 12 the residual signal $r(t)$ is applied to sampling arrangement 21 which at the discrete instants $t_o + i\tau$ produces samples $r(i)$ of the residual signal $r(t)$. The samples thus obtained are applied to an analogue-to-digital converter 22 which converts each sample r(i) into a sample $\hat{r}(i)$ in digital form. These digital samples $\hat{r}(i)$ form the digital control signal which is applied to the correction arrangement 12.

The sampling arrangement 21 is controlled by the sampling pulses which are derived by means of frequency multiplier 23 from the clock pulses which are applied to the regenerator 10 and the data source 7. This multiplier 23 has a multiplying factor L(L=integer) so that the sampling pulses occur at a rate L/T. In connection with the preceding it holds that: $\tau = T/L$.

The correction arrangement 12 comprises shift registers 13 and 14 to which the binary data samples a(k) and b(k), respectively, are applied at the discrete instants $t_o + kT$. Herein k represents a number of the set 0, $\pm 1$, $\pm 2$, .... The shift register 13 comprises N-1 shift register elements $13_1$, $13_2$, ... $13_{N-1}$, each having a time delay T and producing the data samples a(k−1), a(k−2), ... a(k−N+1), respectively. The shift register 14 comprises M shift register elements $14_1$, $14_2$, ... $14_M$, each having a time delay T and producing the data samples b(k−1), b(k−2), ... b(k−M), respectively. In addition, the correction arrangement 12 comprises a modulo-L counter 15 to which the sampling pulses received from the frequency multiplier 23 are applied and the R outputs of which supply the binary signals $l_1(i)$, $l_2(i)$, ... $l_R(i)$. The binary data samples a(k), a(k−1), ... a(k−N+1), b(k−1), b(k−2), ... b(k−M), as well as the binary signals $l_1(i)$, $l_2(i)$, ... $l_R(i)$ form together (N+M+R)-bit addresses for a random access memory 16. The memory comprises $2^{(N+M+R)}$ memory locations corresponding with these addresses, a correction number $C_q$ in base-2 code being stored in each of these memory locations. Herein q represents a number of the set 1, 2, 3, ... $2^{(N+M+R)}$. The memory is read at the discrete instant $t_o + i\tau$, that is to say L-times per data symbol or, put differently, at the same rate as the sampling pulses of sampling arrangement 21. The correction number $C_q$ read at a discrete instant $t_o + i\tau$ becomes available at the output 16-1 for data of the RAM 16 in the form of a synthetic correction signal $\hat{c}(i)$.

For the adjustment of the correction arrangement 12, said arrangement comprises a multiplier 17 and an adder 18. In the multiplier 17 the digital control signal $\hat{r}(i)$ is multiplied by a factor $\alpha$, whose absolute value is much smaller than unity, for the generation of a number which will be denoted by $\Delta \hat{c}(i)$ and indicates the amount by which the synthetic correction signal $\hat{c}(i)$ must be changed in order to reduce the distortion occurring in the receive path 2. These numbers $\Delta \hat{c}(i)$ are applied to the adder 18 to which also the synthetic correction signal $\hat{c}(i)$ is applied. The adder 18 produces in response to the signals applied to it a digital output signal which is equal to $\hat{c}(i) + \Delta \hat{c}(i)$ and which is applied to the input 16-2 for data of the RAM 16 for changing the number $C_q$ which corresponds with the synthetic correction signal $\hat{c}(i)$. Because of this change, the memory location (having the address) q of the RAM will store a new correction number $C_q$ equal to $\Delta \hat{c}(i) + \hat{c}(i)$. If now at a predetermined instant $t_o + (i+p)\tau$, wherein p is a positive integer, the address q occurs again in response to the combination of the address bits formed by the contents of the shift registers 13 and 14 and the output signals of counter 15, then this new correction number $C_q$ will produce a synthetic correction signal $\hat{c}(i+p)$ which is equal to $\hat{c}(i) + \Delta \hat{c}(i)$. At the output of the digital-to-analogue converter 19 this synthetic correction signal $\hat{c}(i+p)$ will cause the occurrence of a correction signal $\tilde{c}(t)$ which forms a better approximation of the pulse distortion occurring in the receive path 2 at the instant $t_o + (i+p)\tau$. The reason is that at the instant at which the address q is formed, the pulse distortion occurring in the receive path 2 predominantly consists of the superposition of the pulse distortions produced always by the same N data symbols $a_n$ and the same M data symbols $b_n$, namely those symbols the sample values of which are part of the address q of the RAM 16. As long as the correction signal $\tilde{c}(t)$ differs from the pulse distortion occurring in the receive path 2, the correction number $C_q$ will be changed in an iterative manner in such a way that the pulse distortion in the residual signal r(t) is reduced.

As the data symbols $a_n$ and $b_n$ change continuously, also the address bits derived therefrom for the RAM 16 will continuously change and, in the manner described above such a correction number will ultimately be formed in each of the memory locations of this RAM that the residual signal at the discrete instants $t_o + i\tau$ will predominantly be free from pulse distortion: that is to say, free from echos as well as from intersymbol interference.

By way of further explanation of the general description of the correction arrangement in accordance with the invention the following illustrative example may serve which is derived from extensive research in the field of full-duplex data transmission over physical wire pairs in the local section of the telephone cable network. It has been found that when a correction arrangement in accordance with the invention is employed, high-grade data transmission at bit rates of, for example, 100 kbit/s over two-wire subscriber cables of the telephone network could be obtained if said correction arrangement were provided with a RAM having 256 memory locations for the storage of correction numbers $C_q$ which could each be represented by a 12-bit number in base-2-code. In this illustrative practical embodiment the (N+M+R)-bit RAM-address consisted of 8 bits, of which N=4 bits were obtained from the shift register 13 connected to the one-way transmit path, M=3 bits from the shift register 14 connected to the output of the regenerator and R=1 bit from a modulo-2-counter 51 (L=2). Extensive experiments showed that when the correction arrangement was dimensioned as mentioned in the foregoing, the negative influence of the pulse distortion in the received signal produced by the simultaneous presence of both an echo signal and intersymbol interference could be reduced to a very great extent so that high-grade data transmission over a diversity of subscriber cables could be realized. In the practical embodiment mentioned here the analogue-to-digital converter 22 used for the adjustment of the correction arrangement was in the form of a one-bit converter in accordance with the Netherlands Pat. application No. 7902053, which has been laid open to public inspection, and use was made of a 12-bit digital-to-analogue converter 19.

The analogue-to-digital converter 22 required for generating the control signal $\hat{r}(i)$ in base-2 code may also be in the form of a multi-bit converter.

The convergence constant $\alpha$ is a design parameter which can be advantageously chosen equal to a negative power of the base number 2. In this case multiplication in the multiplier 17 may be performed by shifting the binary coded number $\hat{r}(i)$ to the right over a number of positions.

If the data symbols $a_n$ occurring in the send path 1 can assume more than 2 values, a code converter 24 must be included in the signal supply lead to shift register 13, as shown in FIG. 1, by means of which the different levels can be encoded by more than one bit, which thereafter may be used as address bits for the RAM 16. In a similar manner, a code converter 25 will have to be included in the signal supply lead to shift register 14 if the data symbols $b_n$ can assume more than two levels.

A pre-equalizing network may, if so desired, be provided between the point where the correction arrangement 12 is connected to the transmit path 1 and the hybrid 4 in order to reduce the intersymbol interference occurring at the transmission of the data signals from the west side to the east side of the transmission system through the two-way path 3.

Without structural modifications the correction arrangement 12 may be used for binary coded signals, such as, for example, for the known "biphase code" and the "Miller code". In that event a coding arrangement 26 will normally be included between the data source 7 and the point in which the correction arrangement 12 is connected to the send path 1. The shift register elements of the shift registers 13 and 14 will than be given a time delay which is equal to the reciprocal value of the repetition rate at which the samples of the coded signals are applied to the shift registers 13 and 14. The sampling rate $1/\tau$ of the correction arrangement 12 must than be equal to or an integral multiple of the repetition rate of the samples applied to the shift register 13, and the clock signal applied to the clock signal input 8 of data source 7 must be derived by means of frequency division from the output signal of the clock extraction circuit 11.

What is claimed is:

1. Apparatus for correcting pulse distortion in a transmission system for simultaneous two-way transmission of data signals formed by sequences of transmitted and received data symbols over a two-wire transmission path comprising:

a random access memory;

a modulo L counter means connected to receive clock pulses having a rate L times the rate of said system data signals;

means for generating a data correction signal from a signal read from said memory;

means for subtractively combining a signal received from said two-wire transmission path and said data correction signal whereby a corrected data signal is obtained;

a data regenerator connected to produce a regenerated data signal from said corrected data signal;

means for addressing the memory at uniform time intervals by address code words determined by the transmitted data signals, said regenerated data signal, and the count of said modulo L counter; and means for changing the contents of an addressed memory location according to the corrected data signal.

* * * * *